United States Patent [19]

Kueppers

[11] Patent Number: 4,878,977

[45] Date of Patent: Nov. 7, 1989

[54] PROCESS FOR MANUFACTURING SYSTEMATIC COLOR TABLES OR COLOR CHARTS FOR SEVEN-COLOR PRINTING, AND TABLES OR CHARTS PRODUCED BY THIS PROCESS

[76] Inventor: Harald Kueppers, Im Buchenhain 1, D-6070 Langen, Fed. Rep. of Germany

[21] Appl. No.: 64,310

[22] PCT Filed: Oct. 17, 1986

[86] PCT No.: PCT/DE86/00419

§ 371 Date: Jun. 15, 1987

§ 102(e) Date: Jun. 15, 1987

[87] PCT Pub. No.: WO87/02455

PCT Pub. Date: Apr. 23, 1987

[30] Foreign Application Priority Data

Oct. 17, 1985 [DE] Fed. Rep. of Germany ....... 3537008

[51] Int. Cl.$^4$ .............................................. B32B 31/00
[52] U.S. Cl. ..................................... 156/264; 101/211; 156/265; 156/277; 156/278; 356/422; 427/162; 427/258; 434/98
[58] Field of Search ............... 156/264, 277, 265, 278; 427/162, 258; 356/422; 434/98; 101/211

[56] References Cited

U.S. PATENT DOCUMENTS 1,597,830 8/1926 Rueger .
3,474,546 10/1969 Wedlake .
3,751,829 8/1973 Foss ..................................... 434/98

FOREIGN PATENT DOCUMENTS 1386888 3/1975 United Kingdom .................. 434/98

Primary Examiner—John J. Gallagher
Attorney, Agent, or Firm—Hill, Van Santen, Steadman & Simpson

[57] ABSTRACT

Method for printing and article produced thereby which uses the six chromatic colors yellow, green, cyan-blue, violet-blue, magenta, red and orange-red and wherein a plurality of color field tables are produced for combinations of two of the chromatic colors which are juxtaposed or neighboring and a plurality of tables for each specific combination is made by varying the amount of black on different color field tables. The color field tables can be utilized to match and obtain desired colors by comparing color field tables with desired colors. If the printing material is not white, the eighth color white may also be used in the printing process.

8 Claims, 3 Drawing Sheets

```
┌─────────────────────────────────────────┐
│ Y₀₀              Y₀₀              Y₀₀   │
│ V₀₀              V₅₀              V₁₀₀  │
│                                         │
│                                         │
│ ┤Y₅₀              VII             Y₅₀├  │
│  V₀₀                              V₀₀   │
│                                         │
│ Y₁₀₀             Y₁₀₀             Y₁₀₀  │
│ V₀₀              V₅₀              V₁₀₀  │
└─────────────────────────────────────────┘

┌─────────────────────────────────────────┐
│ M₀₀              M₀₀              M₀₀   │
│ G₀₀              G₅₀              G₁₀₀  │
│                                         │
│ ┤M₅₀             VIII            M₅₀├   │
│  G₀₀                              G₁₀₀  │
│                                         │
│ M₁₀₀             M₁₀₀             M₁₀₀  │
│ G₀₀              G₅₀              G₁₀₀  │
└─────────────────────────────────────────┘

PROCESS FOR MANUFACTURING SYSTEMATIC COLOR TABLES OR COLOR CHARTS FOR SEVEN-COLOR PRINTING, AND TABLES OR CHARTS PRODUCED BY THIS PROCESS

BACKGROUND OF THE INVENTION

1. Field of the Invention

The present invention is directed to a method for the production of systematic color tables or, respectively, color charts for seven-color printing and is also directed to color tables or, respectively, color charts produced in accord with this method, whereby color fields graduated with respect to one another or continuously blending are printed on a recording medium (printing material).

2. Description of the Prior Art

Systematic color tables for printing technology are already known wherein individual color fields in the form of a two-dimensional table are arranged side-by-side on white printing material (for example paper), whereby the color nuances change from color field to color field with increasing color density values in a prescribed graduation, and whereby the chromatic printing colors yellow, magenta red, cyan blue and the achromatic printing color, black, are usually employed.

Color charts for three-color printing or, respectively, four-color printing are already known which are produced such that an initial table shows systematic mixing possibilities between two chromatic printing colors and a third chromatic printing color is printed onto this initial chart in identical tint graduations, as disclosed, for example, in DuMonts' Farben-Atlas, Second Edition, 1981. Three different initial tables are present in this Farben-Atlas and each of these shows the mixing possibilities of two or the three chromatic printing colors of DIN 16 539. The printing color black is printed over these initial tables in identical tint gradations, as a result whereof these color charts are also suitable as monitoring or, respectively, comparison elements for a special characteristic of four-color printing, namely what is referred to as "achromatic structuring".

SUMMARY OF THE INVENTION

German Patent 29 35 457 discloses a method for the visualization of color nuances that is directed to the visualization of color nuances in an arbitrary magnitude, whereby the individual colors are printed on transparent foils which are placed on top of one another as overlays or, respectively, which are placed on a congruent underlay. What is thereby enabled is making a relatively large number of color nuances visible on the basis of a relatively small number of elements, i.e. underlay and transparent overlays.

Further, PCT/DE 84/04974 A1 discloses a reproduction method for producing multi-colored prints wherein the chromatic impression arises on the basis of a multitude of inked plane elements, whereby the image area is divided into sub-areas of identical size and every sub-area is dissected into juxtaposed plane elements which form a chromatic part and an achromatic part by means of which the color nuance of the appertaining image location which is to be produced is defined and the plane elements which form the chromatic portion are printed with a maximum of two of six chromatic printing colors yellow, orange-red, magenta-red, violet-blue, cyan-blue and green dependent on the chromatic portion to be produced and the plane elements which yield the achromatic portion are proportionally white and black dependent on the achromatic part of the sub-area to be produced.

The object of the present invention is comprised in specifying a method for a reproduction process having seven printing colors which is also referred to as seven-color printing with which systematic color charts or, respectively, color tables are produced. It is thereby irrelevant whether juxtaposed plane elements of PCT/DE 84/04974 A1 or superimposed screen structures are involved.

BRIEF DESCRIPTION OF THE DRAWINGS

The invention shall be set forth below with reference to FIGS. 1 through 4. Shown are:

FIG. 3 three color charts for testing the grey condition of the six chromatic printing colors employed.

DESCRIPTION OF THE PREFERRED EMBODIMENTS

The method of the invention proceeds on the basis of seven inks which are printed on white printing material, for example paper. This involves the six chromatic inks yellow, magenta-red, cyan-blue, violet-blue, green and orange-red and the achromatic ink, black. Six initial tables are provided in FIG. 1, these showing the systematic mixing possibilities between two respectively, juxtaposed (neighboring), chromatic inks, namely between yellow and green, green and cyan-blue, cyan-blue and violet-blue, violet-blue and magenta-red, magenta-red and orange-red, orange-red and yellow. The tables arise in that each of the two initial colors are arranged in a rectangle either in a continuous progression or in tint gradations, being arranged therein such that it proceeds from full area from one edge to being no longer present at the opposite edge. These two graduations of the chromatic inks reside at angles of 90° relative to one another on the area.

The black ink is printed in identical tint gradations on each of the six initial tables which have arisen in this way. The hue value for the black ink changes from table to table. For example, the hue value for the black color on one table can thus amount to 10% for all color nuances and can amount to 15% for another.

The overall color space is divided into six parts in this way, this corresponding to six "integrated tetrahedrons" of a rhombohedron system. (Buch, Die Logik der Farbe, Callwey Verlag, Munich, 1981 Edition, p. 84 ff).

A practical embodiment of the method for producing the color charts shall be set forth below.

Figure 1:
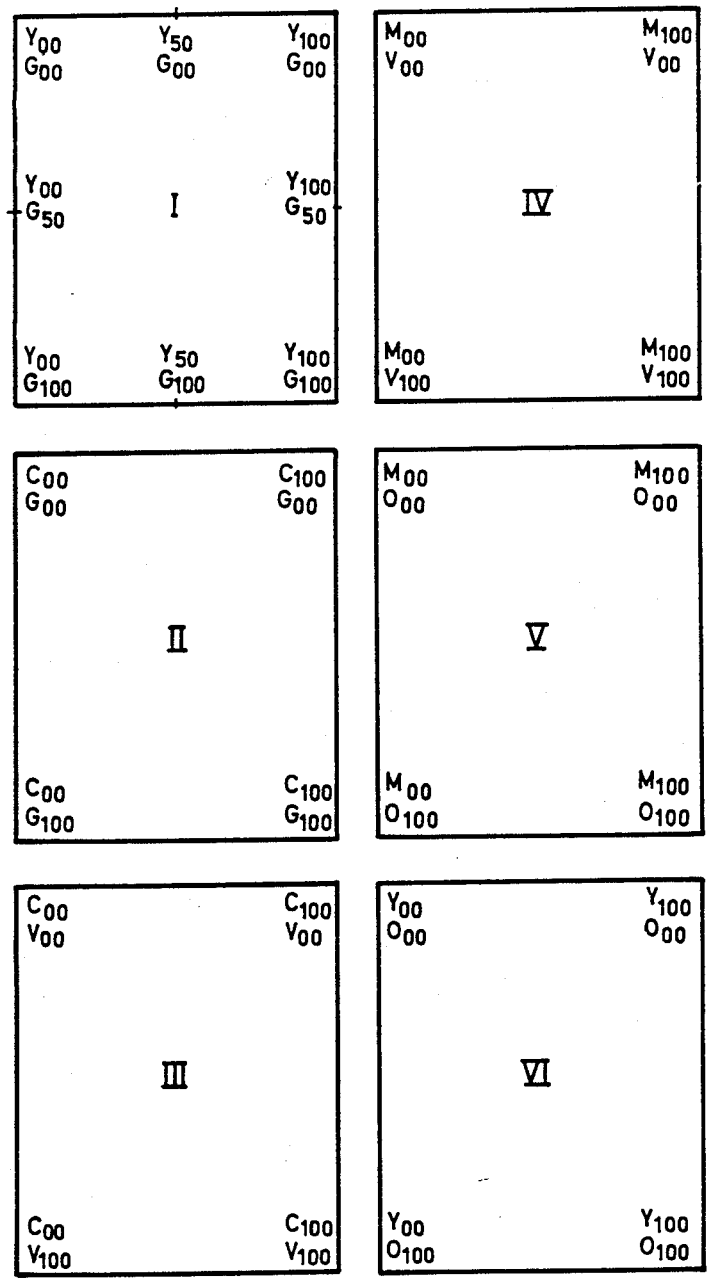
FIG. 1 a schematic illustration of the six initial tables on which the systematics of the respective color graduation may be seen.

FIG. 1 shows six different color charts numbered I through VI which serve as initial tables, whereby the following allocation of the colors is present in the individual color charts.

I: Y/G/S
II: C/G/S
III: C/V/S
IV: M/V/S
V: M/O/S
VI: Y/O/S whereby,
  Y denotes the color yellow,
  G denotes the color green,
  C denotes the color cyan-blue,
  V denotes the color violet-blue,
  M denotes the color magenta-red,
  O denotes the color orange-red, and
  S denotes the color black.

Let the structuring of an individual color chart be set forth with reference to example I of the colors Y/G/S. Chart I begins in the upper left-hand corner with the yellow value $Y_{oo}$ and with the green value $G_{oo}$, whereby the indices indicate the corresponding percentages of the area coverage or, respectively, coloring. The color yellow proceeds from the left-hand edge ($Y_{oo}$) to the right-hand edge ($Y_{100}$).

The color green proceeds from the upper edge ($G_{oo}$) to the lower edge ($G_{100}$). Deriving therefrom for the upper right-hand corner is the designation $Y_{100}$, $G_{oo}$, the designation $Y_{oo}$, $G_{100}$ for the lower left-hand corner and the designation $Y_{100}$, $G_{100}$ for the lower right-hand corner.

All mixing possibilities of these two chromatic initial colors are thus systematically presented.

The further charts II through VI shows corresponding progressions of the colors entered therein.

The entire table system is derived or, respectively, produced from these six initial color charts in that a plurality of further charts agreeing with the plurality of graduations in the black ink to be present in the chart system is produced from each of the six initial tables and respectively one initial table which is over-printed with the respective graduation of the black ink is available for every gradation of the black ink from 0 through 100%. Given a graduation of the black ink in steps of 10%, this means that respectively 11 of these color tables arise for every initial table, whereby 10 thereof are over-printed with the corresponding black steps. Given a graduation of 5%, 21 color tables accordingly derive.

Figure 2:
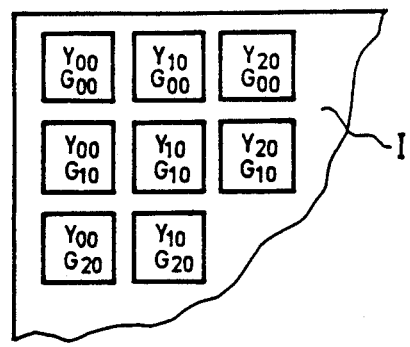
FIG. 2 a portion from color table I of FIG. 1.

FIG. 2 shows an excerpt from color chart I of FIG. 1, namely what is to be shown is how the individual color fields are arranged next to one another within a chart. A graduation of 10% surface coverage (or, respectively, coloring) from color field to color field has been selected, as for example.

FIG. 3 shows an advantageous expansion of the table system for checking the grey conditions. FIG. 3 describes three tables which are reference VII through IX and which show the following combinations of the chromatic colors.

FIG. 3 shows the color tables VII through IX which serve for checking the "grey conditions" of the chromatic inks employed. The charts thereby show systematic arrangements of the following colors:
  VII: Y/V
  VIII: M/G
  IX: C/O In table VII, the coloring of the yellow ink proceeds from the upper ($Y_{oo}$) to the lower edge ($Y_{100}$). The coloring of the violet-blue ink proceeds from the left-hand edge ($V_{oo}$) to the right-hand edge ($V_{100}$). The analogous case applies to the charts VIII for the color pair M/G and IX for the color pair C/O, it following therefrom that the grey conditions become visible on the diagonals from the upper left toward the lower right.

An optimum possibility for monitoring the grey conditions is established in that the complementary colors (compensation colors) are employed for these charts. One can thus find out, for example, whether an ink yellow is too reddish or whether or an ink blue is too greenish. These charts are constructed such that the two colors reside at an angle of 90° relative to one another and proceed over the surface.

Figure 4:
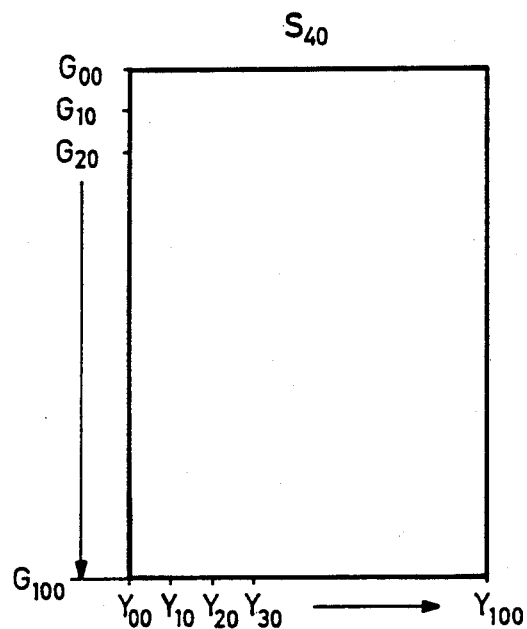
FIG. 4 an example for the characterization of the individual color nuances.

FIG. 4 shows an example of the designation of the individual color nuances. The table value $S_{40}$ is the same for all color nuances of a table. In this example, the values in the horizontal indicate the respective values for green and the values in the vertical indicate the respective values for yellow. The values for every color nuance can be read at the edge of the table, whereby a logical designation derives for every color nuance.

These color charts offer various advantages.

The first advantage is the fact that a color atlas (or, respectively, systematic color tables) having an especially large color space can be produced by multi-color printing in an economical fashion (i.e., cost-beneficially) given relatively low coloring tolerances and without particular technical difficulties.

A second advantage is comprised therein that these systematic color tables can be referred to for the development of a technology of seven-color printing. And, third, an advantage is established in that every color nuance receives a designation which simultaneously functions as "name" for this color nuance and indicates its mixing formula for seven-color printing, whereby the designation can refer to the respective geometrical surface coverge in the copying films.

Such a chart system is also advantageously employed in reproduction technology in producing printer's copies in seven-color printing in order to obtain a precise overview regarding what corrections must be carried out in order to proceed from a given color nuance to a desired color nuance in that the designation of the given color nuance is compared to the designation of the desired color nuance, whereby the difference indicates the required correction.

Let this be explained with reference to the following example. Let the color nuance found objectionable in an image printed in seven-color fashion have the designation $S_{30}$, $M_{40}$ and $O_{70}$. The desired color nuance should have the designation $S_{40}$, $M_{35}$ and $O_{65}$. The difference between these two designations is then consulted for the correction and the following corrections derive: S is intensified by 10%, M and O are each attenuated, i.e., reduced, by 5%.

This means that the color separation in the image location is printed 10% darker in the color separation of black, is printed 5% brighter in the color separation of magenta-red and is likewise printed 5% brighter in the color separation of orange-red.

In accord with an advantageous improvement of the invention, the fields of the tables for the application of rotogravure printing are produced by superimposed printing of continuous tone fields. It can also be advantageous to punch out the individual color fields and releasibly secure them to an underlay. A color atlas comprising moveable chips thereby arises, an extremely easy manipulation of the table system deriving therefrom. The designation can thereby be applied to the front or back of the individual chips.

The printed color fields can also be cut out and glued to some other carrier material.

Further advantages of the invention are comprised therein that the quantity of ink transferred onto the printing material by this procedure is lower than in conventional multi-color printing of DIN 16 539 and is likewise lower than with a new method of achromatic structuring which is presented in DuMont's Farbenatlas wherein the unavoidable color management fluctuations in impression printing lead to lower coloring tolerance than in "orthodox" four-color printing.

Whereas, for example, the orange-red color in four-color printing is formed in that the full color layer yellow and the full color layer magenta-red are printed on top of one another, only a single-color layer of orange-red is now printed in accord with the invention.

The unavoidable tolerances which arise in multi-color printing due to color management fluctuations become significantly less than in color tables that were hitherto known. This is all the more pronounced since the great problem of color acceptance (i.e., the following, chromatic ink is not fully accepted by the previously printed, chromatic ink) is significantly reduced.

In contrast to known systematic color charts, for example color tables of the inks according to DIN 16 439 as well as color tables comprising achromatic structuring in DuMont's Farbenatlas, there are purer, more luminous and stronger colors in this table system in the color ranges violet-blue, green and orange-red. In that respectively two neighboring (juxtaposed) chromatic inks come together in one initial table, for example yellow with orange red or yellow with green, the effect of the faulty absorptions and faulty reflections is significantly lessened, so that correspondingly purer mixed nuances arise.

I claim:

1. A method for producing systematic color tables or, respectively, color charts for seven-color printing, whereby the chromatic printing colors yellow, magenta-red, cyan-blue, violet-blue, green and orange-red and the achromatic printing color black are used comprising the steps of printing a plurality of color field tables onto a printing material with inks of two of said chromatic colors together with the achromatic color, black, with the combinations Y/G/S, G/C/S, C/V/S, V/M/S, M/O/S and O/Y/S being produced, where Y represents the color yellow, M represents the color magenta-red, C represents the color cyan blue, V represents the color violet-blue, G represents the color green and O represents the color orange-red and S represents the color black and wherein said two chromatic colors used are juxtaposed or neighboring and they come together and are overprinted with the achromatic color black to produce the colors on charts or tables.

2. A method according to claim 1, wherein particularly for rotogravure printing, said color field tables are produced by superimposed printing of continuous tone layers.

3. A method according to claim 1 of 2, comprising the steps of punching out said individual color fields and releasably securing them to an underlay, to produce a color atlas with moveable chips.

4. A method according to claim 1 or 2, comprising the steps of cutting out said printed color fields and gluing them onto some other carrier material.

5. A method according to claim 1 or 2, comprising the step of printing on said color field tables the coloring which can be read in the table for every individual color nuance.

6. A method according to claim 1 or 2, wherein white paper is employed as the printing material for said color field tables.

7. A plurality of color field tables for seven-color printing where the chromatic printing ink colors yellow, magenta-red, cyan-blue, violet-blue, green and orange-red and the achromatic printing color black are used, comprising a plurality of color field tables which are overprinted with varying amounts of black for each of the following combinations of Y/G/S, G/C/S, C/V/S, V/M/S, M/O/S and O/Y/S where Y is yellow, M is magenta-red, C is cyan-blue, V is violet-blue, G is green, O is red and S is black and wherein the two chromatic colors used to form the various color combinations are juxtaposed or neighboring and they come together and are overprinted with the achromatic color black to produce the colors on the charts or tables.

8. A plurality of color field tables according to claim 7 wherein the printing material has a color other than white and white is used as an eighth ink to cover areas not covered by the other seven inks.

* * * * *